June 3, 1924.  1,496,141
J. UHLENKOTT
DOUBLE PLATFORM AUTOMOBILE AND WAGON DUMP
Filed Dec. 10, 1921    3 Sheets-Sheet 2
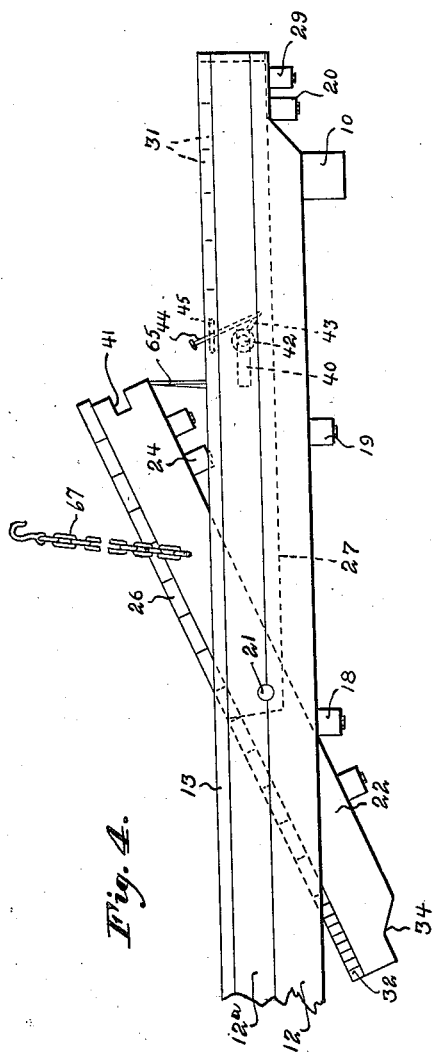
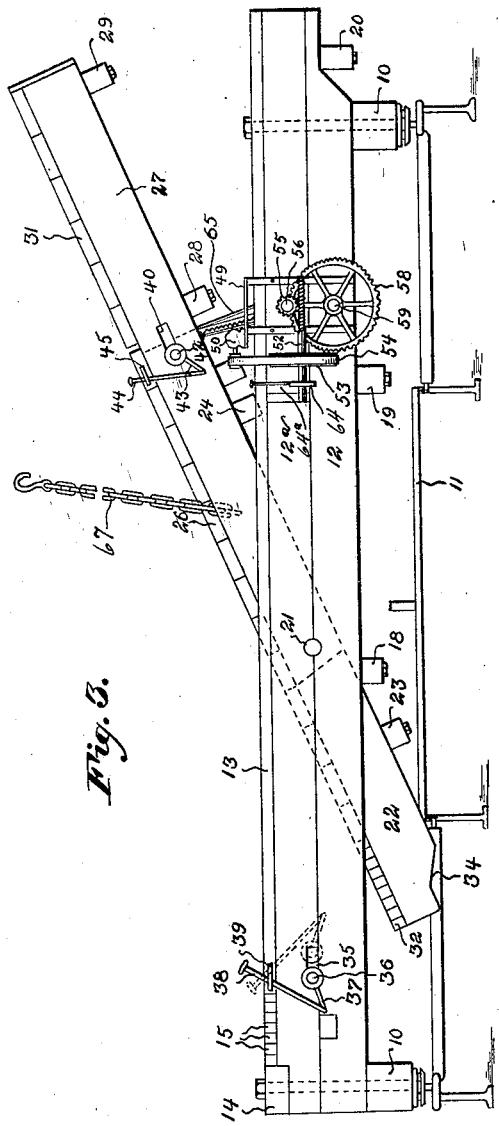
INVENTOR.
Joseph Uhlenkott
BY
Watson E. Coleman
ATTORNEY.

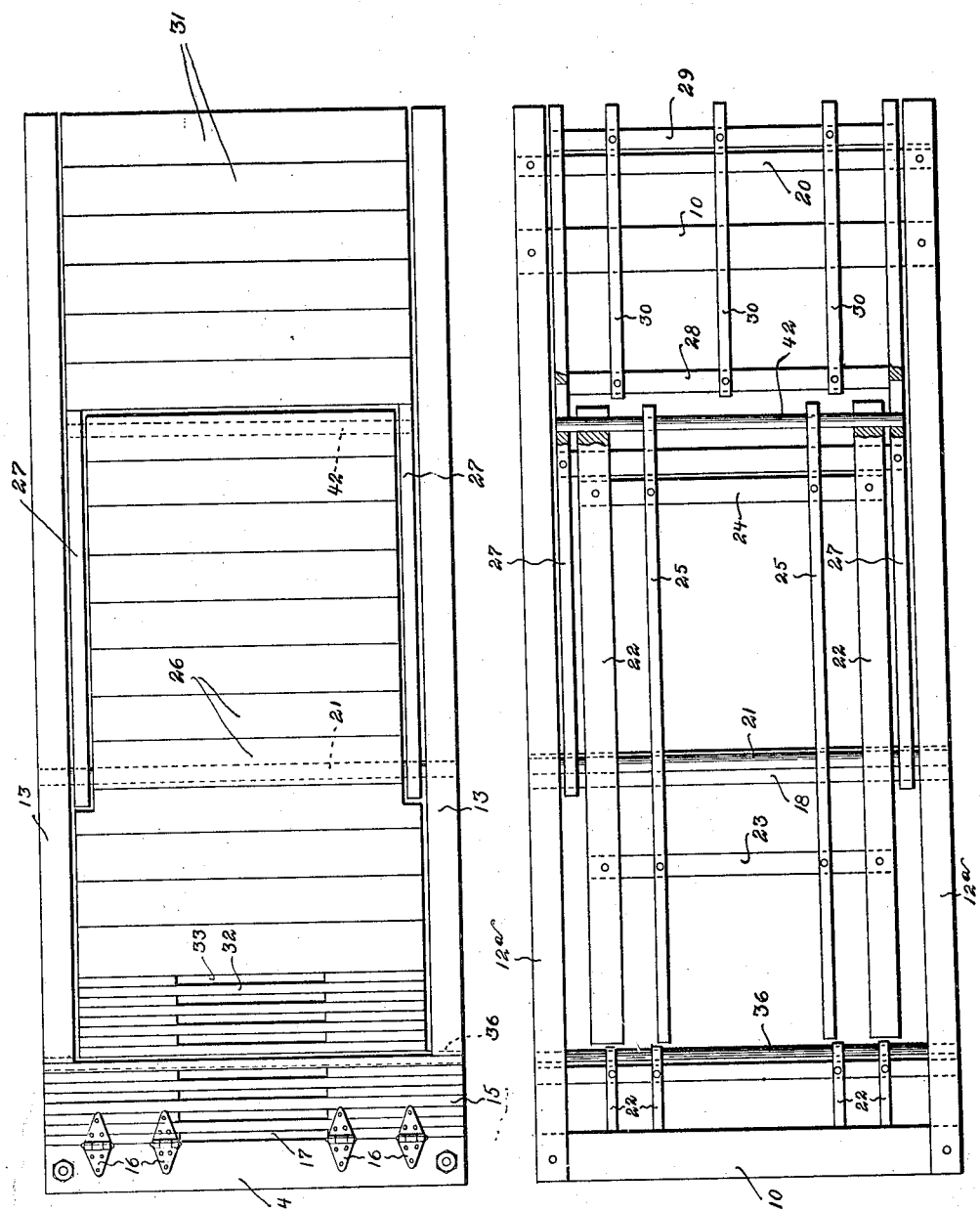

June 3, 1924.

J. UHLENKOTT 1,496,141

DOUBLE PLATFORM AUTOMOBILE AND WAGON DUMP

Filed Dec. 10, 1921   3 Sheets-Sheet 3

INVENTOR.
Joseph Uhlenkott
BY
Watson E. Coleman
ATTORNEY.

Patented June 3, 1924.

1,496,141

UNITED STATES PATENT OFFICE.

JOSEPH UHLENKOTT, OF COTTONWOOD, IDAHO.

DOUBLE-PLATFORM AUTOMOBILE AND WAGON DUMP.

Application filed December 10, 1921. Serial No. 521,365.

*To all whom it may concern:*

Be it known that I, JOSEPH UHLENKOTT, a citizen of the United States, residing at Cottonwood, in the county of Idaho and State of Idaho, have invented certain new and useful Improvements in Double-Platform Automobile and Wagon Dumps, of which the following is a specification, reference being had to the accompanying drawings.

This invention relates to devices for dumping wagons, trucks, automobiles, and the like, and particularly to that class of wagon dumps wherein a tiltable platform is provided whereon the wagon is driven, this platform being tilted to discharge the contents of the truck.

The general object of this invention is to provide a dumping apparatus of this character particularly designed for the purpose of dumping either wagons or automobile trucks when loaded with bulk grain, seeds, ashes, coal, or materials of a similar nature.

A further object is to provide a construction of this character in which the platform is double, permitting the dumping of one section of the platform or of both sections of the platform simultaneously, thus permitting the use of the apparatus for dumping wagons which are relatively short, short automobile trucks or long automobile trucks.

And a further object is to provide an apparatus of this character mounted in connection with a scale frame whereby the truck may be driven upon the platform, weighed, and then dumped.

A still further object is to provide very simple motor operated means whereby the platform may be tilted toward or from its horizontal position, and further to provide very simple means whereby the two sections of the platform may be locked together for unitary movement or unlocked for independent movement.

Another object is to provide upon the fixed portion of the platform latticework planking hinged to the fixed portion of the platform whereby it may be lifted up and this latticework planking permitting spilled grain to pass through.

Other objects have to do with the details of construction and arrangement of parts as will appear more fully hereinafter.

My invention is illustrated in the accompanying drawings, wherein:—

Figure 1 is a top plan view of a dumping platform constructed in accordance with my invention;

Figure 2 is a top plan view of the framework of the dumping platform with the platform board removed;

Figure 3 is a side elevation of the dumping platform showing the double platform in its tilted position;

Figure 4 is a fragmentary side elevation showing the single platform tilted;

Figure 6:
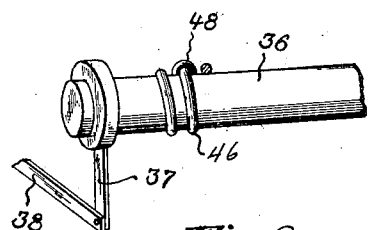
Figure 6 is a fragmentary perspective view of a portion of the locking roller 36.
Figure 8:
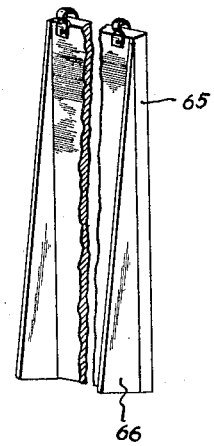
Figure 7:
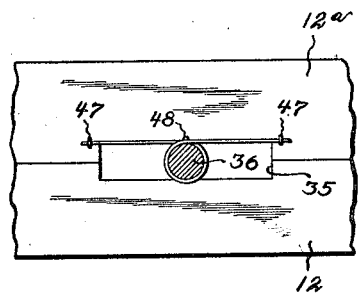
Figure 5:
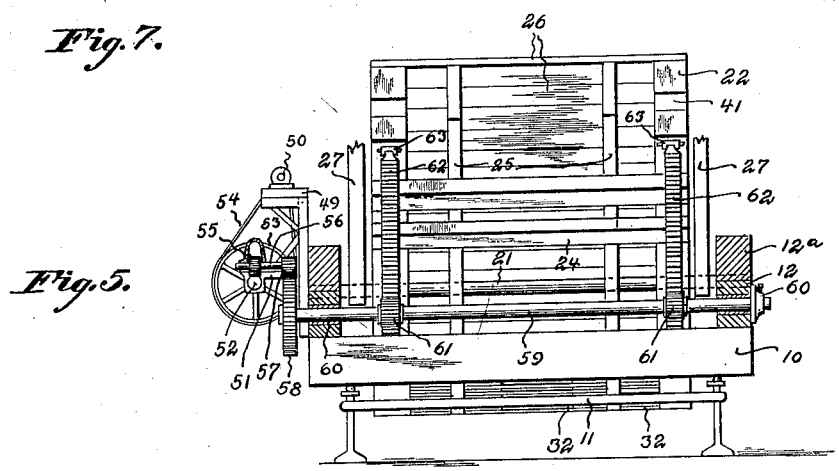
Figure 5 is a transverse sectional view showing the platform 26 raised and looking toward the platform 26.

Figure 7 is a sectional view through the locking roller 36 showing the beams 12 and 12ª in elevation and showing the manner in which the cable is attached to the roller 36;

Figure 8 is a fragmentary perspective view of the gate which is swingingly engaged with the under side of the platform 26.

Referring to these drawings, 10 designates transverse timbers disposed adjacent the ends of the platform and operatively supported upon a weighing structure, designated 11. This scale or weighing structure may be of any suitable character, and I do not wish to be limited thereto, as it forms no part of my invention. Mounted upon the transverse beams 10 are the longitudinally extending sills 12 and 12ª, the sill 12ª being mounted above the sill 12 and resting thereon. Disposed on the top of these beams or sills 12ª is planking 13. Mounted at one end of the longitudinal timbers 12ª is a transverse cross beam 14 which may be bolted to the timbers 12 and 12ª and to the adjacent beam 10. Also mounted upon these sills or beams 12ª adjacent the cross beam 14 is the transverse planking 15 which is hinged to the beam 14 by hinges 16. The middle portion of this planking is formed to provide transversely extending openings 17. In other words, the planking at its middle portion constitutes a latticework.

Extending across beneath the longitudinal beams 12 is a cross beam 18 which constitutes a stop, and also extending across beneath the beams 12 is a cross piece 19 and at the end of the beam 12 remote from the cross piece 14 is a transverse beam 20. The beams 12 and 12a and the planking are bolted to the beam 20 and to the adjacent beam 10 and the beam 19. The beam 18 is also bolted to these longitudinal members 12 and 12a.

Mounted in suitable bearings upon the upper face of the beam 12a is a shaft 21 which constitutes the pivotal center for the tilting platform. As illustrated, this platform is formed in two sections. One of these sections includes longitudinal beams 22 whose ends approximate the end of the planking 15, which planking is supported by the stringers 23. These supporting beams 22 are connected on one side of the shaft 21 by a transverse brace 23 and on the other side by a transverse brace 24. These beams 22 are shorter than the total length of the beams 12 and 12a and supported upon the transverse braces 23 and 24 are the longitudinal stringers 25. The parts 22, 23, 24 and 25 constitute the supporting frame upon which is laid the planks of a platform 26. It will be seen from Figure 1 that that portion of the platform 26 rearward of the pivotal axis of shaft 21 is reduced in width. This reduction is made to accommodate the longitudinal supporting beams 27 of the other section of the platform. These beams 27 are mounted upon the shaft 21 at their forward ends and extend rearward to the ends of beams 12 and 12a and rearward of the end of platform 26. These second beams 27 are connected by transverse braces 28 and 29, these braces in turn being connected by longitudinal stringers 30. The parts which constitute the other section of the platform 31 rest upon the framework formed by the members 27, 28, 29 and 30, and this platform 31, it will be seen, also oscillates upon the shaft 21. Thus both of the platforms 26 and 31 oscillate upon the same center of motion. Therefore it follows that if both platforms be engaged with each other they will form in effect a single relatively long platform upon oscillating upon the axis of shaft 21, but if on the contrary the platform 31 be disengaged from the platform 26 the platform 31 will remain horizontal while the platform 26 may be tilted.

The rear end of the platform 26, as illustrated in Figure 1, also carries transverse planks 32 formed to provide spaces 33 and constitute latticework.

For the purpose of locking the beams 22 from downward movement and thereby lock the platform from tilting movement, I form the forward ends of the beams 22 each with a shoulder 34, and between the superposed beams 12 and 12a beneath the trap door 15 I form the longitudinally extending slots 35. Extending transversely of the frame and rotatably supported in these slots is a locking bar 36 which is adapted to roll on the bottom of the slot, this locking bar carrying a radially projecting arm 37 and a handle 38 which is pivotally connected to the extremity of the arm and extends upward and through a guide 39. When this handle or rod 38 is drawn upward, oscillated, then forced downward, it will rotate the locking bar 36 sufficiently to cause this locking bar to roll the full length of the slot 35 and therefore to roll into the position shown in dotted lines beneath the shoulder 34, in which position it acts as a stop preventing a depression at this end of the platform 26. When it is desired to depress this end of the platform, then the handle or lever 38 is pulled in the reverse direction, which rolls the locking bar along the slot out from beneath the shoulder 34. A like means is used for the purpose of operatively connecting the two platforms 26 and 31. The beams 27 are longitudinally slotted, as at 40, and the ends of the beams 22 are also longitudinally slotted, as at 41.

Disposed transversely in these slots is the locking bar 42 which is also provided with the radially extending arm 43 and with the pivoted handle 44 extending up through the strap 45. It is obvious that when this handle is in the full line position shown in Figure 3 both platforms 26 and 31 will be locked to each other, but that when the handle 44 is pulled upward, turned, and then forced downward, that the bar 42 will roll along the slots 40 and 41 and will disengage the frames of the two platforms from each other so that the platform 31 can remain in its horizontal position while the platform 26 is tilted.

I have provided means whereby these transverse locking rods or rollers 36 and 42 may be positively held in place, and to this end I wrap a small steel cable 46 preferably three times around each end of each rod 42 or 36 as the case may be, and securely fasten the ends of this cable, as at 47. The middle coil or wrap of each cable 46 is held to the locking rollers 36 and 42 by using J-shaped bolts 48 which extend through the roller. This construction gives a positive action to these rollers when being rolled from one end of the slot to the other end.

For the purpose of tilting the platforms, I mount upon one side of the main frame and specifically upon the beams 12 and 12a, a supporting bracket 49 upon which is mounted a motor 50. Mounted upon a bracket 51 below the bracket 49 is a worm shaft 52 which carries upon it a band wheel 53 which is driven from the motor by means of a band 54. This worm shaft engages a worm gear wheel 55 on a transverse shaft 56 which carries a pinion 57. This pinion 57 meshes with a relatively large gear wheel 58 on a transverse shaft 59 mounted in bearings 60 on the beams 12. This transverse shaft 59 carries upon it the two pinions 61 which mesh with rack bars 62 which are hinged at 63 to the longitudinal beams 22 of the platform 26. It will therefore be obvious that when the motor 50 is rotated in one direction, the platform 26 will be elevated or tilted from a horizontal position, and that when the motor 50 is rotated in the other direction the platform 26 will be lowered.

Preferably the motor 50 is a three-phase electric motor controlled by a three-pole double throw switch of ordinary form, and when the switch is connected with one set of poles the motor runs in a direction to raise the platform, and when the switch is connected with the other set of poles the motor is reversed and lowers the platform. Inasmuch as this is a well known manner of connecting electric motors, it is not believed necessary to illustrate it. Preferably the worm shaft 52 is provided with a brake disk 64 and a band brake of any suitable character.

Hingedly connected to the beams 22 adjacent the free ends thereof is a header or shield 65 formed of transverse boards and having longitudinally extending, wedge-shaped cleats 66. These cleats bear upon a slide against the shaft 59 and thus when the beams 22 are tilted this shield or header rises upward, and when the beams 22 are shifted to a horizontal position this shield or header is gradually shifted downward and forward toward an approximately horizontal plane. This shield is particularly designed for use when the platform 31 is left in a horizontal position and the platform 26 is tilted.

In the use of this device, the platform 26 is designed to carry and support a dumping, horse-drawn wagon, and the horses under these circumstances stand upon the platform 31 which remains in a horizontal position. This shield under these circumstances being raised in front of the platform 31 prevents the rim from moving forward into a position beneath the platform 26.

In the use of this device as a dump for automobiles or long trucks, the truck is driven upon the platforms 31 and 26, these platforms being locked together under these circumstances by moving the locking bar or roll 42 and the rear of the slots in the timbers 22 and thereby entering the locking bar in the slots of the forward ends of the wagon drum timbers 25 and 22, locking the two platforms together as one solid platform. When this has been done, the locking bar 36 is shifted from beneath the shoulders 34 by means heretofore described and then the electric motor is started in one direction which, through its worm drive, causes the upward movement of the racks 62 and the lifting of the timbers 22. Inasmuch as the two platforms are then locked together, it is obvious that they will operate as a whole and the platforms will be lifted until the beams 22 strike the transverse stop 18, which will be the critical angle at which the grain or other comminuted material will be discharged from the truck body by gravity.

If it be desired to use the device as a wagon dump where a relatively short platform is necessary, then the locking bar 42 is shifted in a direction to disengage it from the timbers 22 and 25. Then the current is sent through the motor to cause its rotation and through the worm gear, the platform 26 is tilted, the platform 31 remaining in a horizontal position. When the load has been discharged, the switch is reversed to cause the electric current to traverse the motor reversely. The motor reverses and as a consequence, of course lowers the platform. Where a wagon is being dumped the team remains, as before stated, upon the platform 31. The slots 33 and 17 provide means whereby grain or like matter which has been spilled from the wagon or truck in taking the tail gate out will be discharged downward into the pit into which the truck eventually discharges. The brake is preferably operated by stepping upon a member 64ª connected to the band of the brake to thus stop the mechanism quickly or check its speed whenever desired. It will be understood, of course, that the forward end of the tilting platform 26 discharges into a pit or receptacle of any suitable kind or into chutes, this depending upon the character of these chutes or the pit or other receptacle, depending entirely upon the situation in which this device is applied and the manner in which it is designed to be used.

In order to prevent the wagon or truck from rolling down while the platform is in a dumping position, a chain 67 about five feet long is used having an eye bolt in one end, which is bolted through one of the fingers 22. This chain has a hook in the opposite end or free end and this chain is passed through one of the rear wheels of either wagon or truck and hooked so that the vehicle stands in proper position and cannot roll back down the platform. Any other means for chocking the vehicle and preventing its rolling down the platform may be used.

While I have illustrated a construction which has been found thoroughly effective in practice and which is simple and yet effective for the purpose intended, I do not wish to be limited to the details of construction, as it is obvious that these might be varied in many ways without departing from the spirit of the invention.

I claim:—

1. A dumping platform including a supporting frame, a wagon platform pivotally mounted for tilting movement upon said frame, a second platform forming a longitudinal extension of the first named platform and with the first named platform adapted to support a truck, said second platform being normally disconnected from the first named platform and having arms embracing the first named platform and tiltably mounted for movement around the same pivotal axis, means for locking said platforms to each other for unitary movement or unlocking the platforms from each other to permit independent movement, said last named means comprising a transversely extending rod mounted upon the frame and manually shiftable into position beneath the adjacent end of the first named platform or out of such position, and power operated means connected to the first named platform whereby the first named platform may be raised or lowered.

2. A dumping platform including a supporting frame having a trap door at one end, the middle portion of the trap door being formed with apertures and being hinged to the supporting frame, a tilting platform mounted upon the supporting frame and having planking adjacent the trap door formed with apertures, power operated means for shifting said platform toward or from a horizontal position, a second platform forming a longitudinal extension of the first named platform and having arms embracing the first named platform and pivoted upon the same center, and manually operable means for locking the two platforms together or unlocking them to permit independent movement of the first named platform.

3. A dumping platform comprising a supporting frame, a tilting platform formed in two sections, each oscillatable on a common center of movement, longitudinally extending supporting beams for said platforms, the beams of one platform overlapping the other and being longitudinally slotted at their overlapping ends, and a locking bar longitudinally shiftable in said slot to operatively connect or disconnect the two sets of beams.

4. A dumping platform comprising a supporting frame, a tilting platform formed in two sections, each oscillatable on a common center of movement, longitudinally extending supporting beams for said platforms, the beams of one platform overlapping the other and being longitudinally slotted at their overlapping ends, a locking bar longitudinally shiftable in said slot to operatively connect or disconnect the two sets of beams, a rolling locking bar mounted in said slots, and manually operable means for rolling the locking bar along said slots to operatively connect or disconnect the two beams.

5. A dumping platform comprising a supporting frame, a tilting platform formed in two sections, each oscillatable on a common center of movement, longitudinally extending supporting beams for said platforms, the beams of one platform overlapping the other and being longitudinally slotted at their overlapping ends, a locking bar longitudinally shiftable in said slot to operatively connect or disconnect the two sets of beams, a rolling locking bar mounted in said slots, manually operable means for rolling the locking bar along said slots to operatively connect or disconnect the two beams and including an arm mounted on the rolling bar, and a lever pivoted to the extremity of the arm and operatively supported in guides on the platform whereby the rolling bar may be oscillated in one direction or the other to cause it to roll along said slots.

6. In a dumping platform, a supporting frame, a platform pivotally mounted upon the frame for movement toward or from a horizontal position, power operated means for raising or lowering the platform, and means for locking the platform in a horizontal position comprising a rolling locking bar mounted into slots in the supporting frame and shiftable in position beneath the end of said tilting frame or outward of the end of said tilting platform.

In testimony whereof I hereunto affix my signature.

JOSEPH UHLENKOTT.